US012146750B2

(12) United States Patent
Masoud

(10) Patent No.: US 12,146,750 B2
(45) Date of Patent: Nov. 19, 2024

(54) PEER-TO-PEER RIDE-SOURCING SYSTEM

(71) Applicant: THE REGENTS OF THE UNIVERSITY OF MICHIGAN, Ann Arbor, MI (US)

(72) Inventor: Neda Masoud, Dexter, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 121 days.

(21) Appl. No.: 17/851,577

(22) Filed: Jun. 28, 2022

(65) Prior Publication Data
US 2023/0019021 A1     Jan. 19, 2023

Related U.S. Application Data

(60) Provisional application No. 63/216,184, filed on Jun. 29, 2021.

(51) Int. Cl.
| | |
|---|---|
| G06Q 10/047 | (2023.01) |
| G01C 21/34 | (2006.01) |
| G06Q 50/40 | (2024.01) |

(52) U.S. Cl.
CPC ....... *G01C 21/3438* (2013.01); *G06Q 10/047* (2013.01); *G06Q 50/40* (2024.01)

(58) Field of Classification Search
CPC . G01C 21/3676; G01C 21/3438; H04L 67/52; H04L 45/122; H04B 1/3833; H04B 7/14; G06Q 10/047; H04W 28/10; H04W 40/20; H04W 72/04; H04W 40/36; H04W 40/18; H04W 84/22; H04W 84/005; H04W 84/18; H04W 40/24
See application file for complete search history.

(56) References Cited

U.S. PATENT DOCUMENTS

| | | |
|---|---|---|
| 6,868,333 B2 | 3/2005 | Melen |
| 8,649,962 B2 | 2/2014 | Davis et al. |
| (Continued) | | |

FOREIGN PATENT DOCUMENTS

WO    WO-2020081576 A1 *   4/2020  ............ G06Q 50/40

OTHER PUBLICATIONS

Amirmahdi Tafreshian et al., "Trip-based Graph Partitioning in Dynamic Ridesharing", Civil and Environmental Engineering, University of Michigan, Ann Arbor, Apr. 20, 2021.

(Continued)

*Primary Examiner* — Khoi H Tran
*Assistant Examiner* — Bryant Tang
(74) *Attorney, Agent, or Firm* — Harness, Dickey & Pierce, P.L.C.

(57) ABSTRACT

A ride-sourcing method including receiving a plurality of ride-sourcing requests; grouping a first set of the plurality of ride-sourcing requests into a first cluster and a second set of the plurality of ride-sourcing requests into a second cluster; computing a tour formation for each of the first cluster and the second cluster to define a series of stations and a cost function; applying trips to the first cluster and the second cluster under uniformity constraints; repeating the computing and applying steps until the cost function between consecutive iterations is below a threshold to define a first cluster of trips and a second cluster of trips; and assigning the first cluster of trips to a first driver and the second cluster of trips to a second driver.

3 Claims, 3 Drawing Sheets

(56) References Cited

U.S. PATENT DOCUMENTS

| | | |
|---|---|---|
| 9,125,020 B2 | 9/2015 | Banasky, Jr. et al. |
| 10,383,005 B2 * | 8/2019 | Lee .................. H04W 28/10 |
| 10,405,357 B2 | 9/2019 | Egner et al. |
| 10,602,329 B2 | 3/2020 | Addepalli et al. |
| 10,735,284 B2 | 8/2020 | Jalali et al. |
| 2018/0135993 A1 * | 5/2018 | Thangaraj .............. H04L 67/52 |

OTHER PUBLICATIONS

Ma, R., Yao, L., Song, L. et al. A novel algorithm for peer-to-peer ridesharing match problem. Neural Comput & Applic 31, 247-258 (2019).

Liuqing Yang et al., "Vehicle-to-Vehicle Communication based on Peer to Peer Network with Graph Theory and Consensus Algorithm", IET Intell. Transp. Syst., 2019, vol. 13 Iss. 2, pp. 280-285.

Masoud, N., and R. Jayakrishnan. A Real-Time Algorithm to Solve the Peer-to-Peer Ride-Matching Problem in a Flexible Ridesharing System. Transportation Research Part B: Methodological, V. 106, pp. 218-236, 2017.

Pramesh Kumar et al., "An algorithm for integrating peer-to-peer ridesharing and schedule-based transit system for first mile/last mile access", Department of Civil, Environmental and Geo-Engineering, University of Minnesota, Twin Cities, Jul. 15, 2020.

Prabuddha Chakraborty et al., "P2C2: Peer-to-Peer Car Charging", Department of Electrical & Computer Engineering, University of Florida.

\* cited by examiner

PEER-TO-PEER RIDE-SOURCING SYSTEM

CROSS-REFERENCE TO RELATED APPLICATIONS

This application claims the benefit of U.S. Provisional Application No. 63/216,184, filed on Jun. 29, 2021. The entire disclosure of the above application is incorporated herein by reference.

GOVERNMENT INTEREST

This invention was made with government support under CMM12046372 awarded by the National Science Foundation and under 69A3551747105 awarded by the U.S. Department of Transportation. The government has certain rights in the invention.

FIELD

The present disclosure relates to peer-to-peer systems and, more particularly, relates to systems and methods for peer-to-peer applications.

BACKGROUND AND SUMMARY

This section provides background information related to the present disclosure which is not necessarily prior art. This section provides a general summary of the disclosure, and is not a comprehensive disclosure of its full scope or all of its features.

Technological advances in autonomy and communications have given way for new possibilities in peer-to-peer systems. Ridesharing and the gig economy have increased public comfort with business models that can benefit from the various end applications of a peer-to-peer system. With the coming wave of autonomous electric vehicles, a peer-to-peer system can unlock many new types of businesses and can help to improve existing ones.

According to the present teachings, the science of peer-to-peer systems can comprise any one of a number of combinations, not limited to: one to one, one to many, many to one, or many to many. Any such system could benefit from fast matching for each schema type.

The present teachings can use any one of a number of applications including, but not limited to, ridesharing and transportation systems, vehicle communications, food delivery, mobile vendors (food carts/trucks and others), warehouse robotics, peer-to-peer car charging, autonomous trucking, and the like or combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
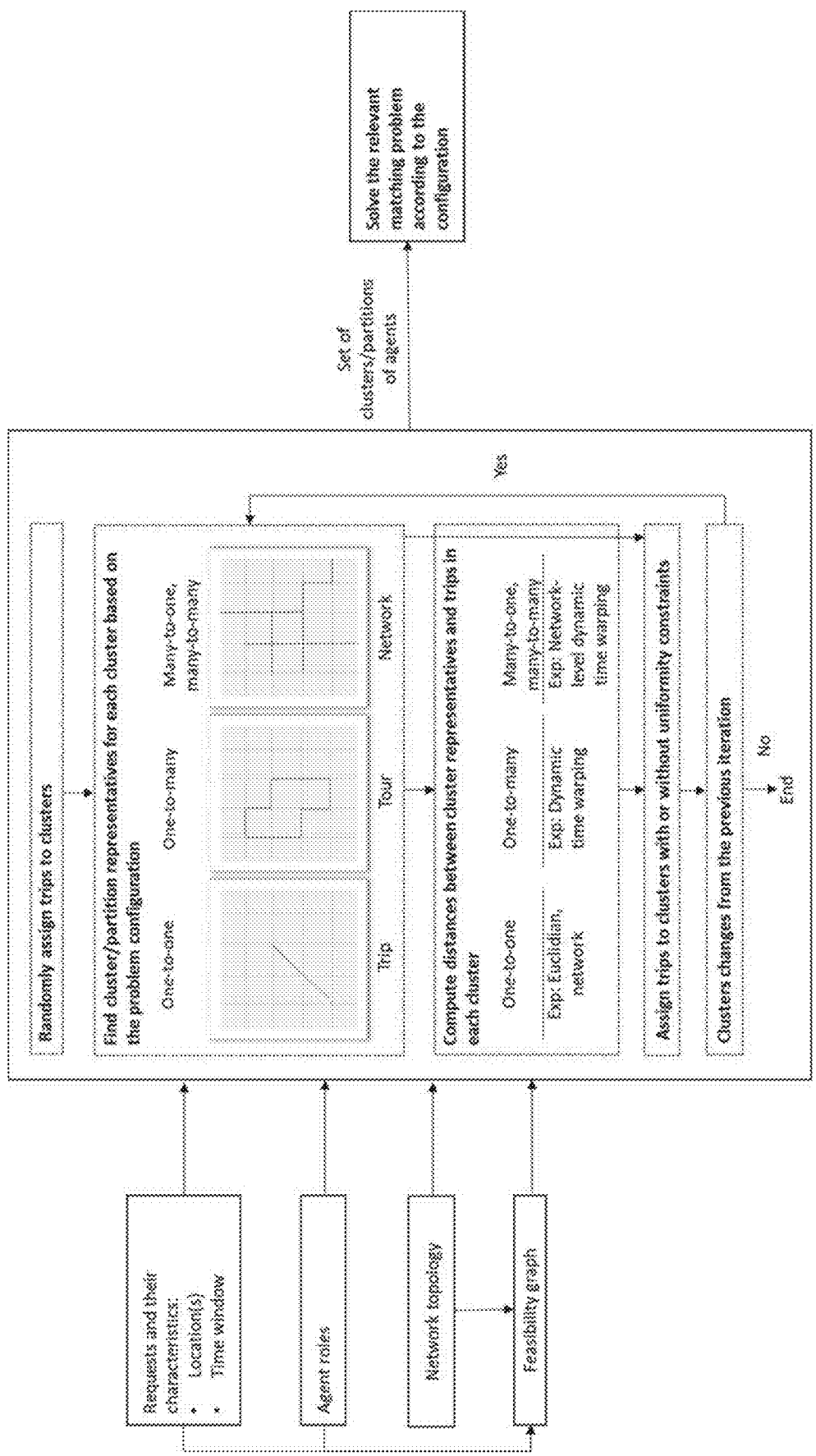
FIG. 1 is a process flow according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure discloses systems and methods in which connectivity and autonomy can shape the next generation of transportation systems. These technological breakthroughs open doors for communication, interaction, and automated negotiation among travelers, vehicles, and the transportation infrastructure, enabling many innovative applications in which value is created from interactions among peers.

As discussed herein, the present systems and methods generally disclose at least three examples of peer-to-peer (P2P) systems including: (1) Shared mobility systems in which a subset of participants use the empty seats in their vehicles to transport others; (2) Platooning, wherein synchronization of vehicle motion allows a group of automated vehicles to travel together at close proximity, thereby increasing fuel efficiency as well as road capacity; and (3) Vehicle-to-vehicle wireless power transfer between electric vehicles, wherein electric vehicles may pair with one another to exchange electric power.

These example applications have the following characteristics in common:
  The value is created as a result of interactions between peers, with no or limited requirement for investment.
  To enable these applications, a centralized system operator should coordinate trips such that they can coincide in time and location.
  A monetary exchange needs to take place from service recipients to service providers.

In some embodiments, there are four types of operational schemes that can be adopted in any P2P system, regardless of the specific application. These operational schemes can give rise to four types of matching problems:
  (1) One-to-one matching: in which a single service recipient is served by a single service provider. In the example of ridesharing, a rider completes her trip in a single vehicle, and a vehicle carries only one rider at once.
  (2) One-to-many matching: in which multiple service recipients may be served by a service provider at once, but each recipient receives full service from a single provider. In the example of ridesharing, a driver may transport multiple riders at once, but each rider completes her trip in a single vehicle.
  (3) Many-to-one matching: in which a single service recipient may be served by multiple service providers, but each service provider serves one request at each time. In the example of ridesharing, one rider may transfer between multiple vehicles to complete her trip, but each vehicle transports a single passenger at once.
  (4) Many-to-many matching: in which a service recipient may be served by multiple service providers, and each service provider may serve multiple requests at once. In the example of ridesharing, a rider may transfer between multiple vehicles, and each vehicle may carry multiple passengers at once.

These four operational schemes may be adopted depending on the nature of the application and the distribution of service providers and recipients. This work produces fast algorithms, systems, and/or methods for each type of matching.

In some embodiments, each agent (e.g., rider or driver in a ridesharing system) provides a time window within which they would like to be served (e.g., a time window within which to start and end their trip in a ridesharing system), and the location(s) relevant to their request (e.g., the origin and destination of a trip in a ridesharing system)

In some embodiments, agent roles (i.e., service provider or recipient) may be provided by agents, or decided by the system. In the ridesharing application, for example, an agent who has access to a vehicle may decide to participate as a driver, or may allow the system to make a determination on her role In some embodiments, network topology shows the relationship between agents, which directly or indirectly can be used to determine whether agents can interact. In a transportation network, for example, network topology determines the travel times between agents' locations A feasibility graph is created based on network topology. In this graph each agent constitutes a node, and nodes associated with any two agents who can successfully interact are connected with an arc. In a ridesharing application, for example, a rider and a driver may be connected if the driver can serve the rider within the rider's time window, and still meet her own time window requirements An iterative procedure places agents in clusters/partitions. The procedure may be repeated separately for each agent type (i.e., once for riders and once for drivers in a ridesharing system), or conducted once for all agent types.

In some embodiments, the procedure starts by randomly assigning objects to clusters. An object in clustering can be defined simply as the service location (e.g., the trip origin, destination, or both in ridesharing), or it could be defined to include multiple pieces of information (e.g., an entire trip, including origin, destination, and time window in ridesharing). Cluster representatives could be the same as clustering objects or different from them, and can be obtained by using an optimization engine or algorithms. The definition of cluster representative will depend on system configuration:
  One-to-one configuration: cluster representative is a trip,
  One-to-many configuration: cluster representative is a tour,
  Many-to-one and many-to-many configuration: cluster representative is a network.

The distance between cluster representative and cluster members may be measured differently depending on system configuration.

According to the distance measure between all objects and cluster representatives, trips are re-assigned to clusters/partitions. This assignment may or may not take place while imposing a uniformity constraint that ensures cluster sizes are within a threshold of one another. Adjusting this uniformity parameter allows the system to capture all possible cases: all clusters exactly the same size, no constraint of cluster sizes at all, and everything in between. The iterative procedure continues until no more changes in clusters/partitions are made in two consecutive iterations.

Once clusters are formed, optimization engines or algorithms can be used to find solutions (which may include matching, scheduling, routing, and role assignment) for clusters independently of each other In some embodiments, the system can adopt a variety of objective functions including, but not limited to maximizing the number of matches between suppliers and recipients, maximizing profit, and maximizing vehicle-miles-travelled savings. In some embodiments, the system strikes a balance between solution time and quality.

INTRODUCTION

In recent years, population and economic growth have led to the formation of traffic jams in metropolitan areas, with direct influence on pollution of exhaust emissions and increasing travel time and cost. Single-occupancy vehicles are a major source for generating carbon dioxide emissions-a problem that is exacerbated due to congestion. However, scaling-up the infrastructure to meet the growing demand is constrained and costly. Therefore, seeking solutions to increase the utilization rate of the existing transportation infrastructure has been the focus of extensive research in the past decade.

A number of alternative modes of transportation have been introduced to expand the utilization rate of the existing transportation infrastructure. Public transportation is a traditional means to reduce the number of single-occupancy vehicles. Public transportation systems, such as buses and rail systems, are generally regulated on a fixed schedule and operated on established routes and charge a posted fee for each trip. Although having a fixed schedule and route could lead to offering more reliable services, the limited operational flexibility of public transportation services leads to more constrained coverage, both spatially and temporally. This has led to a growing interest in shared mobility options, which introduce more flexibility and comfort compared to fixed public transportation options, but offer discounted prices compared to taxis and other private modes of transportation.

Technological advancements such as GPS-enabled smart personal devices, online payment systems and big data together with a global quest for environmentally friendly and cost-efficient mobility options have led to the emergence of a significant number of internet-based companies around the globe that offer ride-sharing and ride-sourcing services to satisfy on-demand requests. Benefits of ride-sharing consist of saving travel cost and possibly travel time for drivers and riders, alleviating traffic congestion, conserving fuel, and mitigating air pollution. According to the National Household Travel Survey (NHTS), which is the authoritative source reporting on the travel behavior of the American public, the average light vehicle occupancy (the number of travelers per vehicle trip) is relatively low—1.67 in 2017, unchanged from 2009. Therefore, ride-sharing services have great potential for development. As such, devising algorithmic tools for real-time matching of drivers and riders in a ride-sharing system, or ride-sourcing with pooling, also known as the ride-matching problem, is an important and timely topic of research.

The present disclosure provides a methodology for efficiently solving the one-to-many ride-matching problem, in which a driver can carry multiple passengers at once or in sequence. More specifically, we introduce a clustering method to decompose the problem into multiple sub-problems such that sub-problems can be optimized independently of each other and in parallel. The proposed method guarantees that the sizes of the sub-problems remain approximately uniform, since the computational complexity of the ride-matching problem grows exponentially with the size of the problem. We use the New York City Taxi dataset to perform numerical experiments. To evaluate the performance of our proposed methodology, we compare the results with the optimal solution as well as three partitioning methods from the literature, namely point-based, balanced point-based, and trip-based partitioning. We also conduct sensitivity analysis to test the impact of the degree of uniformity in the size of sub-problems and the number of clusters on the computation time and the objective function.

According to the principles of the present teachings, we provide a framework to solve the one-to-many ride-matching problem that arises in ride-sharing and ride-sourcing systems in a distributed fashion. Our proposed method forms approximately-uniform clusters of trips, and assigns drivers to trip clusters proportional to the cluster sizes. Different from the existing literature that uses points or trips as cluster centers during partitioning, we use vehicle tours as cluster representatives to capture the fact that ride requests can be pooled and served by a single vehicle even when they do not share the same origin, destination, or time window. This allows for obtaining higher-quality solutions for one-to-many ridesharing systems or ride-sourcing systems with pooling. The proposed method decomposes the original problem into smaller sub-problems that are approximately uniform in size within a threshold of $\varepsilon$. The value of $\varepsilon$ captures the trade-off between the complexity of solving the sub-problems and the lost performance due to partitioning: While setting $\varepsilon=0$ ensures all sub-problems are uniform in size and therefore the solution time is minimized, to obtain such uniform partitioning more potential matches are ignored, thereby affecting the solution quality. Finally, we compare the results of our proposed methodology with three benchmark methods, namely point-based, balanced point-based, and trip-based partitioning, as well as the optimal solution.

As such, the contributions of this paper can be summarized as follows. This is the first study to propose an approximately-uniform clustering method with tours as cluster representatives, which as demonstrated in the numerical experiments section, outperforms existing clustering approaches. We develop an iterative procedure based on Lloyd's algorithm to find approximately-uniform clusters, and show that this clustering approach has favorable properties, such as monotonically converging to a local optimal solution in a finite number of steps.

| TABLE OF NOTATIONS | |
|---|---|
| Sets | |
| $S = \{s\}$ | set of stations where drivers and riders start or finish their trips |
| $D = \{1, \ldots, \mathcal{D}\}$ | set of drivers |
| $R = \{1, \ldots, \mathcal{R}\}$ | set of riders/trips |
| $P = R \cup D$ | set of participants p |
| $R^c$ | set of riders whose trips do not lie on tours |
| $K = \{1, \ldots, \mathcal{K}\}$ | set of clusters |
| $T$ | set of time intervals t |
| $L$ | set of links of $l = (t_i, s_i, t_j, s_j) \in T \times S \times T \times S \in L$ |
| $L_p$ | set of links that are accessible by participant p |
| $L_{rd}$ | set of links on which driver d can serve rider r, where $L_{rd} = L_r \cup L_d$ |
| $\mathcal{L}$ | set of links where $\ell(i, j) \in \mathcal{L}$ indicates rider j can be served after rider i |
| Indices | |
| r, i, j | indices for rider/trip |
| d | index for driver/vehicle |
| p | index for participant (driver or rider) |

TABLE OF NOTATIONS

| | |
|---|---|
| k | index for cluster/tour |
| $\ell = (i, j)$ | link $\ell$ exists if rider $r_j$ can be served following rider $r_i$ |
| Parameters | |
| $s_p^O$ | origin station of participant p |
| $s_p^D$ | destination station of participant p |
| $t_p^{ED}$ | earliest departure time of participant p |
| $t_p^{LA}$ | latest arrival time of participant p |
| $cap_d$ | the capacity of (the vehicle of) driver d (i.e., the maximum number of riders allowed on board at one time) |
| Functions | |
| $T(s_i, s_j)$ | shortest-path travel time between station i and station j |
| c(r, k) | the primary cost between rider trip r and tour k |
| d(r, k) | the secondary cost between rider trip r and tour k |
| $\gamma$(d, k) | the cost between driver d and tour k |
| Decision Variables | |
| $\omega_{rd}$ | binary decision variable that holds the value 1 if rider r is matched with driver d, and the value 0 otherwise |
| $x_d^l$ | binary decision variable that holds the value 1 if driver d travels on link l, and value 0 otherwise |
| $y_{rd}^l$ | binary decision variable that holds the value 1 if rider r is served by driver d on link l, and value 0 otherwise |
| $v_{ij}$ | binary decision variable that holds the value 1 if link$_{ij}$ $\ell$ is selected as a part of the tour u, and value 0 otherwise |
| $f_{rk}$ | a binary variable that holds the value 1 if trip r is assigned to cluster k, and value 0 otherwise |
| $z_{dk}$ | binary decision variable that holds the value 1 if driver d is assigned to cluster k, and the value 0 otherwise |

Problem Statement

Consider a dynamic ride-sharing system that matches drivers with riders in a region over time. Let us divide the study area into a set of stations S=(s1; s2; . . . ; sm), where drivers and riders start or end their trips. Furthermore, we divide the time horizon, e.g., an hour, into a series of short time intervals, e.g., 1 min. After this discretization in time and space, a travel time matrix T can be used to retrieve the shortest path travel time between any pair of stations.

Let us consider a set of drivers D and a set of riders R in this system, and introduce set P=R U D to include all participants. A rider registers her trip, including her origin station, destination station, her earliest departure time, and her latest arrival time. A driver registers her origin station and her earliest departure time. After serving a rider, the driver's time and location will be updated to the rider's drop-off time and location, respectively. Without loss of generality, here we assume that drivers are available for the entirety of the study time horizon.

To accommodate the inherent uncertainty present in a dynamic ride-sharing system, we adopt a rolling horizon strategy, in which the system operator solves the ride-matching problem periodically, at evenly-spaced points in time to which we refer as re-optimization times. The time period between two consecutive re-optimization times is a re-optimization period.

Figure 2:
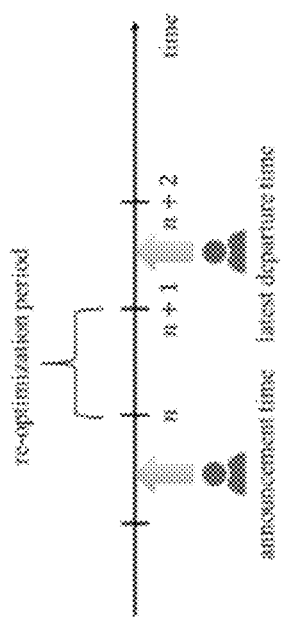
FIG. 2 is a schematic of a rolling horizon according to the present disclosure.

At each re-optimization time, we formulate a ride-matching problem that consists of all announced trips that have not yet expired or finalized. An announced trip is considered expired if its latest departure time occurs before the end of the current re-optimization period. In FIG. 2, for example, all trips whose announcement times are before re-optimization time n and latest departure times are after re-optimization time n+1 will be considered in the ride-matching problem in the specified re-optimization period. (Note that we require the latest departure time of a trip to be higher than n+1 to account for solution time.) An announced trip is considered finalized if it has been previously matched in the ride-matching problem. Drivers who are matched previously can always be part of the new ride-matching problem after accounting for their previous assignments, i.e., the new origin station and earliest departure time of a driver who is transporting a passenger will be set to the drop off location and time of their onboard passenger, respectively. The objective of the ride-matching problem is to maximize the number of served riders. Since the dynamic ridesharing system solves ride-matching problems that are structurally similar across re-optimization periods, in rest of this disclosure and in the previously filed provisional application we focus our discussion to the optimization problem in a single re-optimization period.

Solution

In this disclosure we devise a framework to solve the ride-matching problem that arises in dynamic ride-sourcing systems in a distributed fashion. The methodology is based on clustering, where ride requests are grouped into a number of clusters so as to (1) maximize the intra-cluster similarity between trips within a cluster, and (2) guarantee cluster sizes to be uniform within a threshold. The proposed clustering approach accounts for the fact the ultimate goal is to form vehicle tours in each cluster, thereby using tours, i.e., sequences of trips, as cluster representative. We devise what we call the E-uniform tour-based algorithm to assign trips to clusters, and prove its convergence. Next, we optimally assign drivers to clusters, and solve the ride-matching problem for clusters independently of each other. Using the New York City taxi dataset, we conduct extensive numerical experiments to analyze the performance of the proposed methodology and compare it against three state-of-the-art benchmarks, namely point-based, balanced point-based, and trip-based clustering, as well as the optimal solution. First, we demonstrate that the proposed methodology has favorable convergence properties, providing solutions in a few iterations. Secondly, we demonstrate the importance of forming approximately-uniform clusters, and showcase the resulting trade-offs between solution time and quality. Finally, we show that our proposed methodology could result in a statistically significant increase in the matching rate compared to the benchmarks, where this improvement decreases with the number of clusters.

Methodology

For a detailed account of the methodology of the present teachings, attention is directed to U.S. Provisional Patent Application No. 63/216,184, filed on Jun. 29, 2021 (hereinafter "Application '184"), which was previously incorporated herein by reference.

The matching problem in (10) of Application '184 can be solved quickly for the instance presented in section 5 therein using commercial solvers, because of the problem's relatively small size. However, solving the optimization problem in model (10) for larger instances of the ride-matching problem can be computationally prohibitive for real-time implementations. As such, in the present disclosure, we propose a framework to produce high-quality solutions in near real-time. This framework includes a clustering algorithm, which we call ε-uniform tour-based clustering. This clustering algorithm seeks to group trips into multiple clusters that can be optimized independently of each other.

After the clusters of trips are formed, we present an optimization-based algorithm to assign drivers to clusters of trips. Finally, we present the overall framework.

ε-Uniform Tour-Based Clustering

The proposed ε-uniform tour-based clustering algorithm iterates between the following two steps until convergence: (1) partitioning trip requests into approximately-uniform clusters so as to minimize the intra-cluster distances, and (2) finding the best representative for each cluster. In the present teachings, we describe different components of the proposed clustering approach and demonstrate each component using the illustrative example. We then combine the components to present the clustering method.

The Tour Forming Problem

Let us define a cluster as a set of trips, and a vehicle tour to represent the members of a cluster. A tour is a sequence of stations to be visited by a vehicle. We select a vehicle tour as a cluster representative since the underlying ride-matching problem is a one-to-many problem, indicating the importance of the sequence in which trips are served in obtaining a high quality solution. The tour-forming problem seeks to find the best vehicle tour for a cluster of trips. This problem can be represented by a graph G=(R; L), where R is the set of ride requests and L is the link set. A link between riders i and j exists in graph G if rider j can always be served following rider i. This condition can be mathematically expressed in inequality (1) of Application '184. This inequality ensures that a driver who drops off rider i at her latest arrival time still has enough time to transport rider j to her destination within this rider's requested time window. Furthermore, we introduce two nodes, O and D, such that there is an outgoing link from node O to all other nodes and an incoming link from all nodes to node D.

Under this setting, we seek to find the longest tour, i.e., the tour that contains the greatest number of trips. This tour-finding problem can be formulated as a longest path problem, as presented in model (2) and following.

A series of algorithms or decision steps can be expressed as follows in algorithm 1, 2, and 3:

---

Algorithm 1: Obtaining the dissimilarity between a trip and a tour

Input:     A trip $[s_r(1), s_r(2)]$
            A tour $[s_k(1), s_k(2), \ldots, s_k(m)]$
            Shortest-path traveltime matrix $T_t$
Output: The distance $d(r, k)$ between trip r and tour k
Step 1 Assume an initial distance matrix D of size $2 \times m$ as follows $$D = \begin{bmatrix} T(s_r(1), s_k(1)) & \ldots & T(s_r(1), s_k(m-1)) & T(s_r(1), s_k(m)) \\ \infty & \ldots & \infty & T(s_r(2), s_k(m)) \end{bmatrix}$$

Step 2 Update the distance matrix D
for $q = m - 1, \ldots, 1$ do
            $D[2, q] = \min \{ T(s_r(2), s_k(q)), D[2, q+1] \}$
Step 3 Calculate the distance between trip r and tour k $$d(r, k) = \min_q \{ D[1, q] + D[2, q] \}$$

---

Algorithm 2: The ε-uniform tour-based clustering Algorithm

Input: Set of trips, $\mathcal{R}$
        Number of clusters, $\mathcal{K}$
        Uniformity parameter, ε
        Max number of iterations, $\alpha_{max}$
Output: $\mathcal{K}$ clusters of trips and their corresponding tours, T*
for $a = 1, \ldots,$ itr do
| Step 0 Initialization
| Obtain $f_{rk}^*(0)$ by randomly dividing $\mathcal{R}$ trips into $\mathcal{K}$ clusters
| $\alpha \leftarrow 1$
| Step 1 Tour formation
| Choose a random sample of trips in each cluster (where clusters are determined by
| $f_{rk}^*(\alpha - 1)$) to form new tours by solving the optimization problem in model (2) for
| each cluster. Let w* be the optimal value of the objective function.
| $v_{ij}^*(\alpha) \leftarrow \text{argmax } w^*$
| Step 2 Cost update
| Calculate the new primary and secondary costs, $c(n, k)$ and $d(n, k)$, respectively, using
| Equation (3) and Algorithm 1, and based on $f_{rk}^*(\alpha - 1)$ and $v_{ij}^*(\alpha)$
| Calculate $h_\alpha = \sum_{k=1}^{\mathcal{K}} \sum_{r=1}^{\mathcal{R}} c(r, k)$
| Step 3 Assignment
| Assign $\mathcal{R}$ trips to K clusters. Set z* as the number of trips on tours, and find $z_s^*$ by
| solving the optimization problems in model (8).
| $h_{\alpha + 1} \leftarrow z^*$
| $f_{rk}^*(\alpha) \leftarrow \text{argmin } z_s^*$
| Step 4 Termination criteria
| if $h_\alpha = h_{\alpha + 1}$ or $\alpha = \alpha_{max}$ then
|   | $C_a = h_\alpha$
|   | $T_a = \{f_{rk}^*(\alpha), v_{ij}^*(\alpha)\}$
|   |_ Terminate
| else
|   | $\alpha \leftarrow \alpha + 1$
|   |_ Go to Step 1
| $T^* \leftarrow T_a$ corresponding to the solution with the minimum $C_a$ Algorithm 3: Assignment of drivers to clusters Input: $K$ tours, $T^*$
  Set of drivers, D, with their origins, $s_d^O$ and earliest departure times, $t_d^{ED}$
Output: Driver assignment to clusters, $z_{dk}^*$, $\forall d \in D, k \in K$
$n_k \leftarrow$ number of trips a cluster k under $T^*$
  Step 1 Average cost of driver-tour assignment
for $d \in D$ do
| for $k \in K$ do
| | Find the first trip in tour k that can be served by d based on $t_d^{ED}$. Denote this trip
| | as r. Denote the number of trips after this trip on the tour as $n_{num}$ $$\gamma(d, k) = \frac{T(s_d^O, s_r^O)}{n_{num} + 1}$$

Step 2 The driver assignment problem
Solve the optimization problem in (9) to obtain the optimal driver-cluster assignment, $z_{dk}^*$ $$\min \sum_{d \in D} \sum_{k \in K} \gamma(d, k)\, z_{dk} \tag{9a}$$

$$\sum_{d \in D} z_{dk} \geq \left\lceil \frac{\sum_{n \in R} \int_{rk}^{\tilde{s}} }{R} \tilde{p} \right\rceil \quad \forall k \in K \tag{9b}$$

$$\sum_{k \in K} z_{dk} = 1 \quad \forall d \in D \tag{9c}$$

$$z_{dk} \in \{0, 1\} \quad \forall d, \forall k \in K \tag{9d}$$

Figure 3:
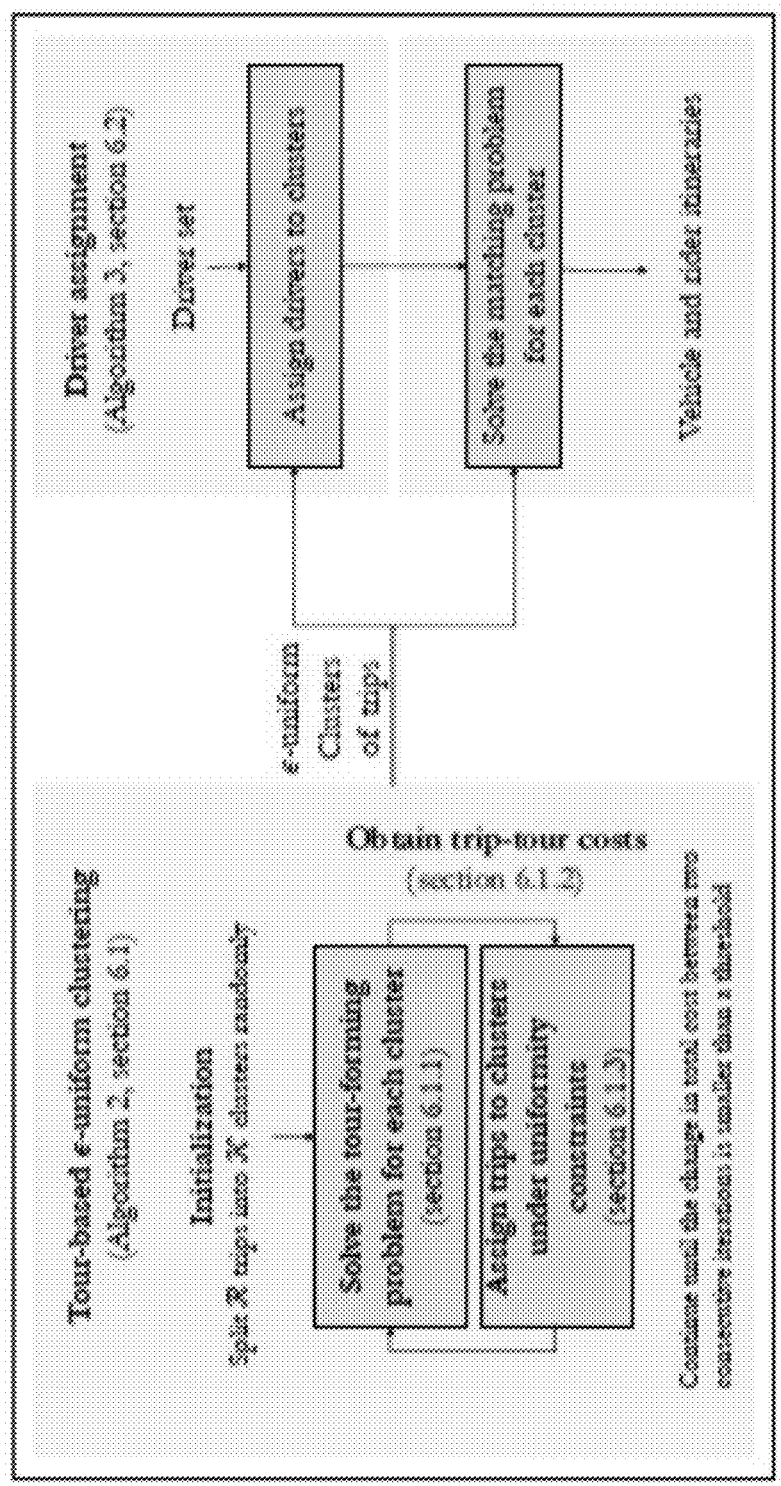
FIG. 3 is a process flow according to the present disclosure.

FIG. 3 displays how different components form the general framework. As this figure demonstrates, first the E-uniform tour-based clustering algorithm generates approximately uniform clusters of trips. Next, drivers are assigned to clusters proportional to the cluster sizes. Finally, the matching problem can be solved independently for each cluster.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A ride-sourcing method comprising:
  a. at least one service provider receiving a plurality of ride-sourcing requests from at least one service recipient, each of the plurality of ride-sourcing requests comprising an origin, a destination, and a time window within which to start and end to define a trip;
  b. grouping a first set of the plurality of ride-sourcing requests into a first cluster of trips and a second set of the plurality of ride-sourcing requests into a second cluster of trips;
  c. computing a tour formation for each of the first cluster and the second cluster to define a series of stations and a cost function;
  d. applying each of the trips to the first cluster and the second cluster under uniformity constraints to obtain approximately uniform clusters;
  e. repeating steps c and d until the cost function between consecutive iterations is below a threshold to define a first cluster of trips and a second cluster of trips and performing dynamic re-optimization of steps c and d; and
  f. assigning the first cluster of trips to a first driver and the second cluster of trips to a second driver.

2. The ride-sourcing method according to claim 1 wherein the step of grouping the first set of the plurality of ride-sourcing requests into the first cluster of trips and the second set of the plurality of ride-sourcing requests into the second cluster of trips comprises randomly grouping the first set of the plurality of ride-sourcing requests into the first cluster of trips and the second set of the plurality of ride-sourcing requests into the second cluster of trips.

3. The ride-sourcing method according to claim 1 wherein the step of assigning the first cluster of trips to the first driver and the second cluster of trips to the second driver comprises determining the average cost of driver-tour assignment.

\* \* \* \* \*